United States Patent [19]

Selfridge et al.

[11] Patent Number: 4,801,332

[45] Date of Patent: Jan. 31, 1989

[54] HIGH STRENGTH ASPHALT CEMENT PAVING COMPOSITION

[75] Inventors: Philip T. Selfridge, Half Moon Bay; John B. Leonard, Jr., Hillsborough; Patrick K. Clancey, San Mateo, all of Calif.

[73] Assignee: Chemcrete International Corp., San Mateo, Calif.

[21] Appl. No.: 9,410

[22] PCT Filed: Oct. 6, 1986

[86] PCT No.: PCT/US86/02056

§ 371 Date: Jun. 15, 1987

§ 102(e) Date: Jun. 15, 1987

[87] PCT Pub. No.: WO87/02373

PCT Pub. Date: Apr. 23, 1987

[30] Foreign Application Priority Data

Oct. 15, 1985 [CN] China ................ 851.07558

[51] Int. Cl.$^4$ ................. C08L 95/00; C10C 3/02
[52] U.S. Cl. ................. 106/273.1; 106/DIG. 7; 106/269; 106/281.1; 208/44
[58] Field of Search ............... 106/281 R, 273 R, 269, 106/DIG. 7; 208/5, 6, 22, 44

[56] References Cited

U.S. PATENT DOCUMENTS

| | | | |
|---|---|---|---|
| 1,505,880 | 8/1924 | Fairlie | 106/281 R |
| 2,282,703 | 5/1942 | Burk | 106/269 |
| 2,339,853 | 1/1944 | Hemmer | 106/269 |
| 2,375,055 | 5/1945 | Weetman | 106/DIG. 7 |
| 2,430,546 | 11/1947 | Agnew | 106/269 |
| 2,928,753 | 3/1960 | Schmitt | 106/269 |
| 4,234,346 | 11/1980 | Latta, Jr. et al. | 106/273 R |

*Primary Examiner*—Paul Lieberman
*Assistant Examiner*—Helene Kirschner
*Attorney, Agent, or Firm*—Hosier & Sufrin, Ltd.

[57] ABSTRACT

A paving composition formed of aggregate and asphalt cement in which the asphalt cement is treated with a combination of a primary catalyst comprising a compound chosen from the group consisting of asphalt cement soluble organic-manganese, organic-cobalt, and organic-copper compounds, or a mixture of two or more thereof, and a secondary catalyst comprising an asphalt cement soluble organic-iron compound.

20 Claims, No Drawings

HIGH STRENGTH ASPHALT CEMENT PAVING COMPOSITION

TECHNICAL FIELD

The present invention relates generally to paving compositions and more particularly to an improved asphalt cement paving composition and method for its formation.

BACKGROUND ART

Asphalts combined with aggregates have been employed as paving compositions for many years. Asphalts generally include bitumens as a predominant constituent and are conventionally obtained as a solid residue from the distillation of crude petroleum. In forming paving compositions, asphalts must be converted to a fluid state.

One fluid form of asphalt is the suspension or emulsion of asphalt in water. After spreading and compressing aggregate/asphalt emulsion paving compositions, the water evaporates and the asphalt hardens into a continuous mass. Another fluid form of asphalt employed in paving is a cutback, i.e., a fluid petroleum product produced by fluxing an asphaltic base with a suitable organic solvent or distillate. Pavements are formed by spreading aggregate/cutback paving compositions and evaporating the volatile distillate from the mass.

An advantage of forming pavements with asphalt emulsions and cutbacks is the avoidance of high temperature application. In the most common paving technique, the asphalt and aggregate are mixed and applied at elevated temperatures in order to maintain the asphalt in a fluid state in forming the pavement. This asphalt, which is neither cutback nor emulsified, is referred to as an asphalt cement.

A major problem with cutbacks and emulsions is their low adhesivity to aggregate in comparison to asphalt cement. This is due primarily to the presence on the aggregate surface of (a) the organic solvent or oil in the cutback and (b) the water in the emulsion which interfere with the formation of an adhesive bond between the aggregate and the asphalt.

One technique which has been disclosed to increase the adhesivity of emulsions and cutbacks is set forth in U.S. Pat. No. 3,243,311. There, the aggregate is pretreated with one of a variety of metal compounds stated to be cross-linking agents for the organic binder to oxidize, polymerize or catalyze and thereby harden the binder. The pretreatment is supposed to improve adhesivity of the binder and aggregate, specifically for clay-type soil aggregates. The cross-linking agents are stated to be multioxidation state metals in their higher oxidation state, with the anions including a large variety of organic and inorganic acids. In addition, salts such as the halides and a large variety of inorganic oxides are mentioned. The cations disclosed include Group I, Group IV, Group V, Group VII, and Group VIII metals as well as rare earth metals. Specific examples include $Cu(OH)_2$, $CuCl_2$, $FeCl_3$, $CuSO_4$ and $KMnO_4$. In each instance, the soil is pretreated with the cross-linking agent prior to mixing with the asphalt.

In U.S. Pat. No. 1,328,310, an asphaltic pavement is disclosed in which copper sulfate is added to the asphalt for improving physical properties. Other compounds mentioned for this purpose include the sulfates or selenates of aluminum, chromium, iron, indium, gallium, and the sulfates or selenides of sodium, potassium, rubidium, ammonium, silver, gold, platinum or thallium. These compounds are relatively insoluble in the asphalt.

In U.S. Pat. No. 2,773,777, a bituminous composition particularly suitable for airport runways exposed to the high temperatures of the exhaust gases of jet engines is disclosed. The composition includes bitumen emulsion, portland cement, and mineral aggregate. To this mixture is added an aqueous solution of one of a number of water soluble salts for the purpose of giving plasticity to the composition. The salts disclosed are water-soluble polyvalent metal salts of a strong mineral acid, especially sulfuric, hydrochloric and/or phosphoric acids. The most effective salts are stated to be alkali earth metal salts including calcium chloride, magnesium chloride, barium chloride and the like. Salts of amphoteric metals are also taught to be useful, including aluminum sulfate, chromium chloride and aluminum chloride. Other disclosed salts include antimony chloride, cobalt chloride, ferric chloride, antimony sulfate, cadmium sulfate and magnesium chloride. The specific examples include as salts calcium chloride, aluminum sulfate and magnesium chloride.

In U.S. Pat. No. 2,342,861, the examples illustrate the addition of a lead soap, specifically lead oleate or naphthenate, to asphalt cutbacks or emulsions to increase their adhesivity for aggregate. Although in all illustrated examples only lead is disclosed as a metal soap to increase adhesivity, that patent suggests that other heavy metal salts of organic acids could be employed including the following metals: Fe, Al, Mn, Zn, Co, Ni, Sn, Ca, Sr, Ba, and Mg. The patent discloses a technique of forming the lead soap by heating a lead oxide in the presence of the desired organic acids. Such lead soaps are then added to the desired asphalt.

Heavy metal salts of high molecular weight organic acids, such as naphthenates or linoleates, have been employed to prevent cracking in blown or oxidized asphalt coatings. For example, U.S. Pat. No. 2,282,703 discloses the use of heavy metals such as cobalt, manganese, iron, lead, vanadium, or zinc dispersed into the blown asphalt for this purpose.

Heavy metal soaps have also been disclosed for use as a dispersant in roofing asphalts to prevent failure of the asphalt due to "alligatoring". U.S. Pat. No. 2,928,753 discloses the polyvalent metal salts of copper, cobalt, or manganese in combination with high molecular weight monocarboxylic acids such as oleic or naphthenic acid. The final disclosed product is an aggregate-free 0.025 inch thick coating on an aluminum sheet so that leveling occurs.

In U.S. Pat. No. 1,505,880, copper slag is added with the aggregate to asphalt to increase the toughness of the resulting pavement composition.

In British Pat. No. 533,977, lead or iron double salts of organic acids are disclosed for the purpose of improving adhesivity of asphalt for mineral aggregate. Also disclosed for this purpose are other di- and and multi-valent metals such as aluminum, chromium, copper and mercury.

In U.S. Pat. No. 4,244,747, as asphalt paving composition is disclosed in which manganese chloride is dissolved in asphalt cement and then mixed with an aggregate. When the manganese chloride is present in quantities of about 0.02 to about 2 weight percent of the asphalt cement, the compressive, flexural and fatigue strength of the ultimate cured paved road is increased.

In U.S. Pat. No. 4,234,346, the use of organic-manganese compounds soluble in asphalt cement are disclosed. Certain organic-manganese compounds, either alone or in cooperation with organic-copper or organic-cobalt compounds, are dissolved in asphalt cement and then mixed with an aggregate to form a paving composition exhibiting increased compressive, flexural and fatigue strength in the ultimate cured pavement.

French Pat. No. 1,567,671 and Austrain Pat. No. 285,788, describe a process for decreasing the content of asphalt paraffins in distillation asphalts, wherein the starting asphalt, in the presence of 0.1 to 1.0 percent manganese or cobalt compounds, is blown with air at a temperature of 110° to 150° C. The asphalt is thus subjected to a catalytic oxidation wherein, besides insoluble metal oxides, such as manganese oxide, a certain portion of soluble metal compounds, such as manganese stearate, are present.

SUMMARY OF THE INVENTION

In accordance with the present invention, it has been found that a paving composition with improved characteristics as described below can be obtained by treating asphalt cement with a combination of a primary catalyst comprising a compound chosen from the group consisting of asphalt cement soluble organic-manganese, organic-cobalt, and organic-copper compounds, or a mixture of two or more thereof, and a secondary catalyst comprising an asphalt cement soluble organic-iron compound, and then mixing the treated asphalt cement with aggregate. In quantities sufficient to produce total catalyst metal ion concentrations of 0.015 to 0.5 percent by weight of the asphalt cement, the combination of the primary and secondary catalysts produces a paving composition of the same ultimate strength as that obtained with the primary catalyst alone, using considerably less of the more expensive primary catalyst and, more importantly, producing, at lower pavement curing temperatures, a significant increase in the rate at which the compressive, flexural and fatigue strength of the ultimate cured pavement is achieved.

As used herein, the term "asphalt cement" refers to substantially unblown or unoxidized solid or semi-solid materials (at room temperature) which gradually liquify when heated. The predominant constituents of the materials are bitumens, which are obtained as a residue of refinery processing. The term excludes emulsions of asphalt in water and cutbacks of asphalt. Thus, it contains neither the water phase of the emulsion nor the extraneous petroleum solvents or flux oils commonly added to asphalt to convert it to a cutback. The asphalt cement is generally characterized by a penetration of less than 600 at 25° C., and a typical penetration between 40 and 300 (ASTM Standard, Method D-5). The viscosity of asphalt cement at 60° C. is more than about 65 poise.

The term "pavement" is intended to include, without limitation, asphalt cement/aggregate outdoor and indoor load bearing surfaces including roadways for vehicles, airport runways and aprons, parking lots, sidewalks, factory and other types of floors, and loading platforms.

The term "lower pavement curing temperatures" in the present context means temperatures below the temperatures normally experienced by pavements in the United States. Such normal summer pavement temperatures are usually above 35° C. and may be higher than 60° C. Therefore, in the present context the phrase "lower pavement curing temperatures" is to be understood as pavement temperatures below about 35° C.

In the practice of the present invention, the asphalt cement is fluidized by heating to a temperature above its melting or softening point and then treated with the combination of the primary and secondary catalysts to provide a solution of manganese, and/or cobalt, and/or copper ions with iron ions in warm, fluid, asphalt cement. The treated, warm, fluid, asphalt cement is then mixed in this warm, fluid, form with aggregate for use in pavement construction.

It is a particular object of this invention to provide an asphalt cement/aggregate paving composition which exhibits a significant increase in the rate at which the strength gain of the cured pavement is achieved at lower pavement curing temperatures.

It is another object of this invention to provide a method of making a warm, fluid, asphalt cement composition which is of suitable viscosity for paving but which cures into an asphalt cement/aggregate paving composition of exceptional strength after paving.

It is yet a further object of this invention to provide a method for treating asphalt cement which is too soft, in its untreated state, to form a practical load bearing pavement.

These and other objects of the present invention together with the various advantages thereof will become apparent to those skilled in the art from the detailed disclosure of the present invention as set forth below.

MODES FOR CARRYING OUT THE INVENTION

The present invention relates to an asphalt cement composition which, when combined with aggregate, forms a paving composition of significantly improved physical properties. The asphalt cement composition is made by treating asphalt cement with a combination of a primary catalyst comprising a compound chosen from the group consisting of asphalt cement soluble organic-manganese, organic-cobalt, and organic-copper compounds, or a mixture of two or more thereof, and a secondary catalyst comprising an asphalt cement soluble organic-iron compound, while the asphalt cement is maintained in a fluid state by heating. It is preferred in the practice of the invention that organic-manganese, either alone or with organic-cobalt and/or organic-copper, be used as the primary catalyst.

In accordance with the present invention, the primary and secondary catalysts should be thoroughly and evenly dispersed and dissolved throughout the asphalt cement so that the strength improving effect is imparted to the final product in a consistent manner. For optimum dispersion, the manganese, cobalt, copper and iron are used in the form of organic compounds which are soluble in a significant portion of the asphalt cement. The organic compounds may be unsubstituted or substituted (e.g., with sulfur, particularly sulfonates, or with phosphorus, particularly phosphates). Suitable anions for the asphalt cement soluble organic-manganese, organic-cobalt, organic-copper, and organic-iron compounds are derived from carboxylic acids, alcohols, phenols, and ketones. Preferable anions include carboxylic acids having up to about 30 carbon atoms in the chain, such as acetates, linoleates, octoates, naphthenates, oleates, decanoates, sterates, and laurates, and mixtures thereof or mixtures with other acids. Secondary, tertiary or multifunctional carboxylic acids may also be used.

The combination of primary and secondary catalysts may be carried in an organic oil as a means of lowering the viscosity of the asphalt cement mixture. This lower viscosity is in some cases preferred to facilitate the transport of the material and to improve the accuracy of application and the degree of dispersion on blending with the asphalt cement. Typical useful dilutions are from 0.5 to 16 percent by weight of total metal ions to total additive. Such levels of organic oil will result in oil levels of less than 7 or 8 percent by weight of the asphalt cement (typically below 5 percent) which are well below the level of flux oil contained in a cutback.

Significant improvements in the asphalt cement are obtained in ythe method of the present invention by adding a relatively small quantity of the combination of asphalt cement soluble primary and secondary catalysts. Typically, sufficient quantities to produce total catalysts metal ion concentrations in the range of 0.015 to 0.5 percent by weight of the asphalt cement are used. Total metal ion concentrations of 0.05 to 0.5 percent by weight of the treated asphalt cement are preferred and total metal ion concentrations of from 0.05 to 0.25 percent by weight of the asphalt cement are most preferred.

The operative concentration of the iron ions of the secondary catalyst may range from 0.005 to 0.20 percent by weight based on the treated asphalt cement, with the preferred iron ion concentration ranging from 0.01 to 0.15 percent by weight of the treated asphalt cement. The operative concentration of the manganese and/or cobalt and/or copper ions of the primary catalyst may range from 0.01 to 0.50 percent by weight of the treated asphalt cement, with the preferred total manganese and/or cobalt and/or copper ion concentrations ranging from 0.05 to 0.25 percent by weight of the asphalt cement.

If the concentration of the primary and secondary catalysts falls below or exceeds the levels necessary to achieve the operative ion ranges stated above, a paving composition of inferior quality will be produced. If excess concentrations of the primary and secondary catalysts were used, the resulting pavement composition would be brittle and would not withstand the stress and strain of practical use. Also, such excess amounts of the manganese, cobalt and copper ions would be uneconomical. If the concentrations fall well below the operative concentrations, the curing process would occur at a reduced rate at lower pavement curing temperatures, and in some instances there would be no strength gain in the paving composition at any curing temperatures.

In accordance with the present invention, the foregoing combination of primary and secondary catalysts, carried in an organic oil if desired, is dissolved in the asphalt cement by heating the asphalt cement to above its softening or melting point until it is sufficiently fluid to thoroughly and evenly disperse and dissolve the catalysts. This technique is designated "warm mixing" herein. The catalysts are preferably in liquid form. For most conventional asphalt cements, it is necessary to heat the asphalt cement to at least 100° C., and typically to about 110° to 150° C. to render it fluid. At such temperatures, the viscosity of the asphalt cement composition is sufficiently reduced to permit thorough dispersion and dissolution of the catalysts.

In conventional processing, the treated asphalt cement is maintained in a fluid state from its time of formation, during normal storage and through transport to the asphalt mixing plant. There the fluid asphalt cement is mixed with aggregate and the mixture is hauled to the paving site where it is spread and compacted to form a pavement. In an alternative to such conventional processing, the asphalt cement could be heated at the construction site and the catalysts could be warm mixed with the asphalt cement just prior to combining it with the aggregate for paving.

The treated asphalt cement of the present invention is characterized by a viscosity in the fluid state at the elevated temperature of paving comparable to that of conventional asphalt cement. However, as set forth below, the cured pavement has vastly superior strength in comparison to one formed with conventional asphalt cement, even when cured at lower pavement curing temperatures. The word "cure" in the present context means the achievement of substantial completion of the strength gain reaction.

The warm mixed treated asphalt cement in fluid form is combined at an asphalt mixing plant (or on site) with preheated, predried aggregate to form a paving composition comprising a homogeneous mixture of uniformly coated aggregate particles. The aggregate is preferably heated under conditions of time and temperature to drive off essentially all free moisture prior to mixing with the asphalt cement. During mixing, both the aggregate and the treated asphalt cement are typically at a temperature of 100° C. to 160° C. Before the composition has cooled to a temperature at which it loses it workability, it is spread and compacted. Then, the treated asphalt cement/aggregate composition is permitted to cure. After curing, the pavement comprises aggregate bound by a matrix of treated asphalt cement.

The aggregate used in the present invention should be of a type suitable for the type of pavement desired. It may range from fine particles such as sand to relatively coarse particles such as crushed stone, gravel or slag.

In accordance with the present invention, a major portion by weight of aggregate is mixed with a minor proportion by weight of the treated asphalt cement containing the primary and secondary catalysts uniformly dispersed and dissolved therein. The ratio of aggregate to treated asphalt cement is that which is typical for the particular paving applications. Thus, a minimum of about 85 percent by weight of aggregate and generally about 90 to 98 percent by weight of the total paving composition is employed in the process of the present invention.

After the treated asphalt cement/aggregate composition is prepared, it is spread, compacted and permitted to cure. For treated asphalt cement/aggregate compositions prepared in accordance with the invention, acceptable curing occurs at ambient temperatures with moderate elevations in temperature, e.g. to 60° C., accelerating the curing process. Very high temperatures, however, such as those employed to blow asphalt are deleterious and should not be used in the practice of the present invention.

As set forth in the background of the invention, heavy metal soaps have been employed in combination with asphalt cement for a number of different purposes. For example, they have been used to avoid cracking in blown asphalt cement, and to prevent alligator cracking in roofing materials. Also, such metal soaps have been disclosed for use in road building compositions of aggregate and asphalt cement cutbacks or asphalt cement emulsions to improve the poor adhesivity of the asphalt cement in these forms for the aggregate. The prior art teaches the general equivalency of multi-valent heavy metal ions for this purpose. For example, in the aforementioned U.S. Pat. No. 2,342,861, experiments were performed employing lead soaps to increase adhesivity of emulsified asphalt cement for aggregate. In accordance with the state of art, the patent asserts that other metals such as iron, aluminum, manganese, zinc, cobalt, nickel, tin, calcium, strontium, barium, or magnesium could also be employed for the same purpose.

U.S. Pat. No. 4,234,346 discloses the use of asphalt cement soluble organic-manganese, asphalt soluble organic-cobalt or asphalt cement soluble organic-copper in warm mixing techniques using asphalt cement for forming a paving composition. It indicates that these metals are vastly superior to the remainder of the above-mentioned heavy metals for this purpose. U.S. Pat. No. 4,234,346 also shows that asphalt cement soluble organic-iron (alone) in such paving compositions is virtually useless.

With the above background knowledge, it has unexpectedly been discovered that the addition to such compositions of a combination of a primary catalyst comprising a compound chosen from the group consisting of asphalt cement soluble organic-manganese, organic-cobalt, and organic-copper compounds, or a mixture of two or more thereof, and a secondary catalyst comprising an asphalt cement soluble organic-iron compound, because of the synergy between the metals, causes an increase in the rate of strength gain at lower pavement curing temperatures. Another result of this synergy is the ability of the paving composition to achieve the same ultimate strength gain and improvement in other properties with less manganese, cobalt or copper, so that the total metal ion content need not be much greater than when the primary catalyst is used alone. This makes possible a more economical paving mixture since iron as metal is less expensive than manganese, cobalt or copper, as metal. It should be noted that the need for an increase in the rate of strength gain is dictated by the chemical properties of any given asphalt cement or the application conditions and that not every asphalt cement or every set of application conditions requires such an increase to achieve acceptable performance.

A further disclosure of the nature of the present invention is provided by the following specific examples of the practice of the present invention. It should be understood that the data disclosed serve only as examples and are not intended to limit the scope of the invention.

EXAMPLE #1

Comparative tests were performed using asphalt cements of penetration grades 60/70 and 180/200 with no metal additive and the 180/200 penetration grade asphalt cement treated with manganese alone and with manganese plus iron. A decomposed granite sand was used as the aggregate portion of the sand asphalt mix. In each case, the asphalt cement made up 7.0 percent of the total mix (ie. approximately 1 part asphalt cement or treated asphalt cement to 13.3 parts sand). The asphalt cement soluble organic-metal compounds were tallates, naphthenates or octoates, but need not be limited to these compounds. The asphalt cement soluble organic metal compounds (in liquid form) were mixed into the asphalt cement which was in liquid form at temperatures sufficient to allow easy mixing of the asphalt cement soluble organic metal compounds and the asphalt cement (120° to 130° C.) so as to form a homogeneous mixture. Manual stirring was employed to thoroughly disperse the metal throughout the asphalt cement. The asphalt cement, treated and untreated, was mixed with preheated, predried sand at the same temperature and specimens 4 inches in diameter and approximately 2.5 inches in length were produced by mechanical compaction. After extraction from the compaction molds, some of these specimens were cured in a forced draft oven at 60° C. for 14 days. The rest were cured at ambient temperature, approximately 22° C. during the day and cooler at night, for 28 days to partially compensate for the fact that the actual rate of reaction is slower at 22° C. than it is at 60° C. The 60° C. tensile strength of each specimen was then determined using the split-cylinder indirect tensile strength test at a rate of loading of 0.05 inches per minute.

The results of these tests are presented in Table I below.

TABLE I

| PEN. GRADE | METAL ION CONTENT IN BINDER | | 60° C. TENSILE STRENGTH (kPa) AFTER CURE AT | |
|---|---|---|---|---|
|  | % Mn | % Fe | 60° C. | 22° C. |
| 60/70 | — | — | 51.1 | 22.1 |
| 180/200 | — | — | 33.7 | 15.8 |
| 180/200 | — | — | 52.3 | 12.2 |
| 180/200 | 0.10 | — | 52.3 | 12.2 |
| 180/200 | 0.13 | — | 63.0 | 10.5 |
| 180/200 | 0.10 | 0.03 | 73.8 | 71.2 |

It is apparent that for this asphalt cement the introduction of a combination of manganese and iron ions in accordance with the present invention dramatically increases the ultimate strength of the asphalt cement/aggregate composition in the specimens cured at ambient temperatures. Furthermore, this data also demonstrates that the 180/200 penetration grade asphalt cement, which could not be used to construct a pavement with adequate load bearing properties due to its poor tensile strength, when treated with manganese/iron ions is upgraded to the more than adequate tensile strength level of the 60/70 penetration grade asphalt cement.

EXAMPLE #2

A series of tests similar to those in Example #1 were carried out using an asphalt cement from a different source. The results of these tests are presented in Table II below.

TABLE II

| PEN. GRADE | METAL ION CONTENT IN BINDER | | 60° C. TENSILE STRENGTH (kPa) AFTER CURE AT | |
|---|---|---|---|---|
|  | % Mn | % Fe | 60° C. | 22° C. |
| 60/70 | — | — | 45.9 | 32.0 |
| 180/200 | — | — | 36.0 | 20.8 |
| 180/200 | 0.14 | — | 70.6 | 14.2 |
| 180/200 | 0.11 | 0.03 | 61.5 | 65.8 |

The results above again indicate that the introduction of the combination of manganese and iron ions in accordance with the present invention produces a significant and heretofore unexpected increase in the ultimate strength of the asphalt cement/aggregate composition in the specimens cured at ambient temperatures.

EXAMPLE #3

In this set of tests, the asphalt cement was the same as in Example #1, but only the 180/200 penetration grade asphalt cement was treated. All test conditions were the same, with the addition of cobalt naphthenate in some cases. Various ratios of iron and cobalt ions are compared, and the results are presented in Table III below.

TABLE III

| | METAL ION CONTENT IN BINDER | | | 60° C. TENSILE STRENGTH (kPa) AFTER CURE AT | |
|---|---|---|---|---|---|
| PEN. GRADE | % Mn | % Fe | % Co | 60° C. | 22° C. |
| 180/200 | 0.10 | — | — | 52.3 | 12.2 |
| 180/200 | 0.10 | 0.030 | — | 73.8 | 71.2 |
| 180/200 | 0.10 | 0.030 | 0.010 | 72.4 | 74.3 |
| 180/200 | 0.10 | 0.027 | 0.001 | 57.3 | 56.4 |
| 180/200 | 0.10 | 0.027 | 0.002 | 72.0 | 74.0 |

The results above indicate that the combination of manganese and iron ions, or manganese, iron and cobalt ions in accordance with the present invention significantly increases the rate of strength gain of the asphalt cement/aggregate composition in the specimens cured at ambient temperatures.

EXAMPLE #4

In this set of tests, the asphalt cement was the same as in Example #1. All test conditions were the same, but various ratios of iron to manganese are compared. The results of these tests are presented in Table IV below.

TABLE IV

| | METAL ION CONTENT IN BINDER | | 60° C. TENSILE STRENGTH (kPa) AFTER CURE AT | |
|---|---|---|---|---|
| PEN. GRADE | % Mn | % Fe | 60° C. | 22° C. |
| 60/70 | — | — | 51.1 | 22.1 |
| 180/200 | — | — | 33.7 | 15.8 |
| 180/200 | 0.10 | — | 52.3 | 12.2 |
| 180/200 | 0.13 | — | 63.0 | 10.5 |
| 180/200 | 0.10 | 0.03 | 75.2 | 68.1 |
| 180/200 | 0.07 | 0.06 | 53.5 | 49.0 |
| 180/200 | 0.05 | 0.08 | 44.3 | 46.8 |

This example illustrates two important advantages of the present invention. First, it indicates that a broad range of ratios of the two metals produces a dramatic increase in the rate of cure at 22° C., each of which represents satisfactory results. Second, it illustrates the economic incentive of employing the present invention by showing that significant amounts of manganese as metal can be replaced with less expensive iron metal without suffering a significant reduction in strength.

EXAMPLE #5

If tests were performed as in Examples #1, #2 and #4, but the manganese were replaced by cobalt or copper, similar dramatic increases in the ultimate strength of the asphalt cement/aggregate compositions in the specimens cured at ambient temperatures would be obtained.

The examples and results above demonstrate that asphalt cement/aggregate compositions made in accordance with the present invention exhibit significantly improved strength gain when cured at ambient temperatures. When such asphalt cement/aggregate compositions are used for paving at lower pavement curing temperatures, they cure at a rate which is significantly higher than that of known compositions to produce a pavement with compressive, flexural and fatigue strength superior to that heretofore available at lower pavement curing temperatures.

It should be understood, of course, that the compositions and methods described above are intended to illustrate embodiments of the invention and not to limit the scope of the invention, which is defined by the claims set forth below. It should also be understood that alternatives to and equivalents of the specific embodiments described can be made and indeed are contemplated without departing from the scope of the invention as defined in the claims set forth below.

What is claimed is:

1. A paving composition comprising a major proportion by weight of aggregate and a minor proportion by weight of asphalt cement, said asphalt cement containing a combination of a primary catalyst comprising a compound chosen from the group consisting of asphalt cement soluble organic-manganese, organic-cobalt, and organic-copper compounds, or a mixture of two or more thereof, and a secondary catalyst comprising an asphalt cement soluble organic-iron a compound "wherein the combination of primary and secondary catalysts is present in the asphalt cement in an amount sufficient to provide from about 0.05 to about 0.25 percent by weight, based on the weight of the asphalt cement, of iron ions and manganese, cobalt or copper ions or a mixture of two or more thereof".

2. The paving composition of claim 1 wherein the primary catalyst is an asphalt cement soluble organic-manganese compound.

3. The paving composition of claim 1 wherein the primary catalyst is a mixture of an asphalt cement soluble organic-manganese compound and an asphalt cement soluble organic-cobalt compound.

4. The paving composition of claim 1 wherein the primary catalyst is a mixture of an asphalt cement soluble organic-manganese compound and an asphalt cement soluble organic-copper compound.

5. The paving composition of claim 1 wherein the primary catalyst is a mixture of an asphalt cement soluble organic-manganese compound, an asphalt cement soluble organic-copper compound and an asphalt cement soluble organic-cobalt compound.

6. The paving composition of claim 1 wherein the combination of primary and secondary catalysts are carried in an organic oil.

7. The paving composition of claim 6 wherein sufficient organic oil is present to produce from 0.5 to 16 percent by weight total metal ions in the combination of the primary and secondary catalysts carried in the organic oil.

8. The paving composition of claim 1 wherein the secondary catalyst is present in an amount sufficient to provide from 0.005 to 0.20 percent by weight, based on the weight of the asphalt cement, of iron ions.

9. The paving composition of claim 1 wherein the secondary catalyst is present in an amount sufficient to provide from 0.01 to 0.15 percent by weight, based on the weight of the asphalt cement, of iron ions.

10. The paving composition of claim 1 wherein the primary catalyst is present in an amount sufficient to provide from 0.01 to 0.50 percent by weight, based on the weight of the asphalt cement, of manganese, coblt or copper ions or a mixture of two or more thereof.

11. The paving composition of claim 1 wherein the primary catalyst is present in an amount sufficient to provide from 0.05 to 0.25 percent by weight, based on the weight of the asphalt cement, of manganese, cobalt or copper ions or a mixture of two or more thereof.

12. The asphalt cement paving composition of claim 1 wherein the aggregate is present at a level of at least about 85 percent by weight based on the weight of the paving composition.

13. The paving composition of claim 1 wherein the asphalt cement is characterized by a penetration of less than 600 at 25° C.

14. The paving composition of claim 1 wherein the asphalt cement is characterized by a penetration of between 40 and 300.

15. The paving composition of claim 1 wherein the anions of the primary and secondary catalysts are derived from organic compounds selected from the group consisting of carboxylic acids, alcohols, phenols, and ketones.

16. The paving composition of claim 1 wherein the anions of the primary and secondary catalysts are derived from carboxylic acids having up to about 30 carbon atoms.

17. A method of forming an asphalt cement paving composition having improved strength characteristics at lower pavement curing temperatures comprising:

treating a fluid asphalt cement with a combination of a primary catalyst comprising a compound chosen from the group consisting of asphalt cement soluble organic-manganese, organic-cobalt, and organic-copper compounds, or a mixture of two or more thereof, and a secondary catalyst comprising an asphalt cement soluble organic-iron compound, and then mixing the treated asphalt cement with the aggregate.

18. The method of forming an asphalt cement paving composition of claim 17 wherein the asphalt cement is heated to at least 100° C. to render it fluid before treatment with the combination of the primary and secondary catalysts.

19. The method of forming an asphalt cement paving composition of claim 17 wherein the asphalt cement is maintained in a fluid state from the time of its treatment with the primary and secondary catalysts through the mixing of the treated asphalt cement with the aggregate.

20. A pavement formed by spreading the paving composition of claim 1, compacting and permitting the composition to cure.

* * * * *